(12) United States Patent
Vollert et al.

(10) Patent No.: US 11,273,815 B2
(45) Date of Patent: Mar. 15, 2022

(54) BRAKING SYSTEM FOR A VEHICLE AND METHOD FOR BRAKING A VEHICLE

(71) Applicant: Robert Bosch GmbH, Stuttgart (DE)

(72) Inventors: Herbert Vollert, Vaihingen/Enz (DE);
Jonathan Schnur,
Bietigheim-Bissingen (DE); Markus Weigel, Loechgau (DE)

(73) Assignee: Robert Bosch GmbH, Stuttgart (DE)

( * ) Notice: Subject to any disclaimer, the term of this patent is extended or adjusted under 35 U.S.C. 154(b) by 76 days.

(21) Appl. No.: 16/856,478

(22) Filed: Apr. 23, 2020

(65) Prior Publication Data

US 2020/0353909 A1 Nov. 12, 2020

(30) Foreign Application Priority Data

May 9, 2019 (DE) .............................. 102019206668

(51) Int. Cl.
*B60T 13/14* (2006.01)
*B60T 15/04* (2006.01)
*B60T 7/12* (2006.01)

(52) U.S. Cl.
CPC .............. *B60T 13/147* (2013.01); *B60T 7/12* (2013.01); *B60T 15/041* (2013.01)

(58) Field of Classification Search
CPC ......... B60T 13/147; B60T 15/041; B60T 7/12
See application file for complete search history.

(56) References Cited

U.S. PATENT DOCUMENTS

| 4,832,416 A | * | 5/1989 | Kaes | ..................... B60T 8/4004 180/197 |
| 7,806,486 B2 | * | 10/2010 | Bitz | ....................... B60T 8/4081 303/20 |
| 9,145,121 B2 | * | 9/2015 | Jungbecker | ........... B60T 8/4081 |
| 9,566,960 B2 | * | 2/2017 | Feigel | ................... B60T 8/4081 |
| 10,525,951 B2 | * | 1/2020 | Hansmann | .............. B60T 11/18 |
| 2017/0282877 A1 | * | 10/2017 | Besier | ................... B60T 13/142 |
| 2018/0222464 A1 | * | 8/2018 | Niepelt | ................... B60T 8/885 |
| 2019/0351886 A1 | * | 11/2019 | Besier | ................... B60T 13/745 |

FOREIGN PATENT DOCUMENTS

EP 0281769 A2 9/1988

\* cited by examiner

*Primary Examiner* — Pamela Rodriguez
(74) *Attorney, Agent, or Firm* — Norton Rose Fulbright US LLP; Gerard Messina

(57) ABSTRACT

A braking system for a vehicle, which includes a control system configured to: actuate a pressure generation device in accordance with a braking request signal to generate the brake pressure; ascertain an operational state of the pressure generation device; ascertain a position of a displacement piston of a brake master cylinder based on the braking request signal; and couple a pressure modulation device to a brake master cylinder volume and actuate the device so that the pressure modulation device conveys brake fluid out of the brake master cylinder volume into the wheel brake circuit, if the operational status of the pressure generation device is ascertained to be nonoperational and the displacement piston is in the idle position.

9 Claims, 2 Drawing Sheets ately manually, or by way of a brake booster. The hydraulic pressure generated in the brake master cylinder is conveyed to wheel brakes in order to build up a brake pressure. Pressure modulation circuits, which have a pressure modulation device that is coupled via input and output valves to the wheel brakes, are often integrated into such braking systems in order to allow modulation of the brake pressure independently of the brake master cylinder. One such system is described, for example, in European Patent No. EP 0 281 769 A2.

In such systems, in the event of a failure of the brake booster, generation of the brake pressure is usually assisted by the pressure modulation device which, in order to build up the brake pressure, conveys brake fluid out of the brake master cylinder into the wheel brake circuit.

So-called "brake by wire" systems are also increasingly being used. In a braking system of this kind, a hydraulic pressure is generated in a simulator device by actuation of a brake master cylinder. The pressure generated by the brake master cylinder, or a travel of a displacement piston of the brake master cylinder, is detected, and a corresponding braking request signal is generated therefrom. By way of a pressure generation device that is coupled to a wheel brake circuit, the brake pressure is established in the wheel brake circuit in accordance with the braking request signal in order to actuate the wheel brakes. U.S. Pat. No. 7,806,486 B2, for example, describes for such braking systems a method for pre-filling the wheel brake circuit, a wheel brake cylinder being abutted against a friction surface of a wheel brake by the fact that pressure is built up in the wheel brake circuit by way of the pressure generation device, independently of a braking request signal.

Such braking systems are also increasingly being combined with pressure modulation devices. In order to efficiently assist the buildup of brake pressure with the aid of the pressure modulation device upon failure of the pressure generation device, it is desirable to furnish a sufficiently large volume of brake fluid in the brake master cylinder. If the voltage supply for the pressure modulation device fails, all of the brake pressure must be generated manually with the aid of the displacement piston of the brake master cylinder. It is desirable, for this, to realize the displacement piston with a cross-sectional area that is as small as possible.

SUMMARY

A braking system, and a method for braking a vehicle, are provided according to the present invention.

According to a first aspect of the present invention, a braking system for a vehicle is provided. An example braking system in accordance with the present invention encompasses: a brake master cylinder having a displacement piston shiftable out of an idle position in a brake master cylinder volume by an input force; a brake fluid reservoir that is coupled to the brake master cylinder volume and is fluid-exchange-capable with the brake master cylinder volume when the displacement piston is in the idle position; a sensor device for generating a braking request signal representing the input force; a wheel brake circuit having at least one wheel brake that has a friction surface and a wheel brake cylinder movable against the friction surface; an electrically driven pressure generation device, coupled to the wheel brake circuit, for generating a brake pressure in the wheel brake circuit in accordance with the braking request signal; a pressure modulation device, coupled to the wheel brake circuit, for modulating the brake pressure that is couplable to the brake master cylinder volume; and a control system that is connected to the sensor device, to the pressure generation device, and to the pressure modulation device in particular in order to exchange electrical or electromagnetic signals or for data communication. The control system is configured: to actuate the pressure generation device in accordance with the braking request signal in order to generate the brake pressure; to ascertain an operational state of the pressure generation device; to ascertain the position of the displacement piston based on the braking request signal; and to couple the pressure modulation device to the brake master cylinder volume and to actuate said device in such a way that the pressure modulation device conveys brake fluid out of the brake master cylinder volume into the wheel brake circuit in order to abut the wheel brake cylinder against the friction surface if the operational status of the pressure generation device is ascertained to be nonoperational and the displacement piston is in the idle position.

According to a second aspect of the present invention, a method for braking a vehicle is provided. An example method according to the present invention encompasses: ascertaining a position of a displacement piston of a brake master cylinder which is shiftable out of an idle position inside a brake master cylinder volume of the brake master cylinder by an input force in order to generate a braking request signal, a brake fluid reservoir being fluid-exchange-capable with the brake master cylinder volume when the displacement piston is in an idle position; ascertaining an operational state of a pressure generation apparatus that is coupled to a wheel brake circuit and is operated so as to generate a brake pressure in accordance with the braking request signal; and carrying out a pre-filling of the wheel brake circuit if the operational status of the pressure generation device is ascertained to be nonoperational and the displacement piston is ascertained to be in the idle position. The pre-filling encompasses: coupling a pressure modulation device, coupled to the wheel brake circuit, to the brake master cylinder volume; and conveying brake fluid out of the brake master cylinder volume into the wheel brake circuit by way of the pressure modulation device in order to abut a wheel brake cylinder of the wheel brake circuit against a friction surface of a wheel brake. In a further step of the method, a brake pressure is generated in the wheel brake circuit by shifting the displacement piston of the brake master cylinder by application of an input force.

The example method according to the second aspect of the present invention can be carried out in particular with the aid of a braking system according to the first aspect of the present invention. The advantages and features described above and hereinafter in conjunction with one of the aspects of the invention are thus also applicable for the respective other aspect.

In accordance with the present invention, the operational state of the pressure generation device is detected, and, when it is detected that the pressure generation device has failed or is not operationally ready, for example because of a defect or an interruption in the electrical voltage supply, carrying out a pre-filling of the wheel brake circuit with brake fluid by way of the pressure modulation device. This is carried out according to the present invention when the displacement piston of the wheel brake cylinder is in an idle position, i.e., is not being actuated. In the idle position, a connecting opening between the reservoir and the brake master cylinder volume is uncovered by the displacement piston so that brake fluid can be supplied from the reservoir back into the brake master cylinder volume. The connecting opening becomes covered or closed by the displacement piston when the latter is moved out of the idle position.

The braking performance of the braking system can be improved by the pre-filling of the wheel brake circuit, since this ensures that a sufficiently large volume of brake fluid is always present in the wheel brake circuit and in the hydraulic cylinder volume. This makes it easier, for example, to assist brake pressure buildup by the pressure modulation device. The diameter of the brake master cylinder can furthermore be decreased, so that on the one hand the brake system can be configured to be more compact, and on the other hand a lower input force is needed in order to generate a given brake pressure.

Advantageous embodiments and refinements are of the present invention are described herein and are shown in the figures.

According to an example embodiment of the braking system, provision is made that the control system has a first control device that is connected to the sensor device and to the pressure generation device, and a second control device that is connected to the first control device and to the pressure modulation device. Optionally, two control devices functionally separated from one another are therefore provided, and are connected to one another for data exchange, for instance via a wire-based or wireless data connection. This advantageously facilitates the space-spacing embodiment of the braking system, for example if the control apparatuses are disposed on a respective housing in which the pressure modulation device or the pressure generation device is disposed.

According to a further embodiment of the present invention, the pressure modulation device has a pump driven by an electric motor, the electric motor being connected to the control system. The electric motor is actuated in particular by motor control commands that are generated by the control system, in particular the second control device, for instance based on acceleration data of a vehicle which are received at a data interface of the second control device.

According to a further embodiment of the present invention, the pressure generation device has a pressure generation displacement piston shiftable by way of an electric motor, the electric motor being connected to the control system. The electric motor is actuated in particular by motor control commands that are generated by the control system, in particular the first control device, based on the braking request signal that is furnished by the sensor device to a data interface of the first control device.

According to a further embodiment of the braking system in accordance with the present invention, provision is made that the brake master cylinder volume is defined by a cylindrical inner surface of a housing, the inner surface having a diameter in a range between 17 mm and 21 mm, in particular in the region of 19.05 mm. In accordance therewith, a particularly compact braking system is implemented, with which high brake pressures can be efficiently built up by way of the above-described pre-filling even in the event of failure of the pressure generation device.

According to an example embodiment of the method in accordance with the present invention, before pre-filling a brake pressure compensation is carried out, if the operational status of the pressure generation device is ascertained to be nonoperational and if it is furthermore ascertained that the displacement piston has traveled out of the idle position, the brake pressure compensation encompasses: coupling the pressure modulation device to the brake master cylinder volume; and conveying brake fluid out of the brake master cylinder volume into the wheel brake circuit in order to generate the brake pressure in the wheel brake circuit in accordance with the braking request signal. Brake pressure buildup by the pressure modulation device is accordingly assisted if the pressure generation device fails and if the displacement piston is out of the idle position and is thereby closing off the connecting opening to the reservoir. This further improves braking performance.

According to a further embodiment of the present invention, provision is made that the pressure generation device is decoupled from the wheel brake circuit before pre-filling and, if applicable, before brake pressure compensation.

In conjunction with hydraulic systems, components, conduits, or the like, "coupling" is understood herein to mean an establishment of, and "decoupling" an interruption of, a fluidically conveying connection between those systems, components, conduits, or the like. Coupling and decoupling can be accomplished in particular by opening and closing a valve, for example a solenoid valve, which connects the systems, components, or conduits.

The present invention is explained below with reference to the Figures.

DETAILED DESCRIPTION OF EXAMPLE EMBODIMENTS

Figure 1:
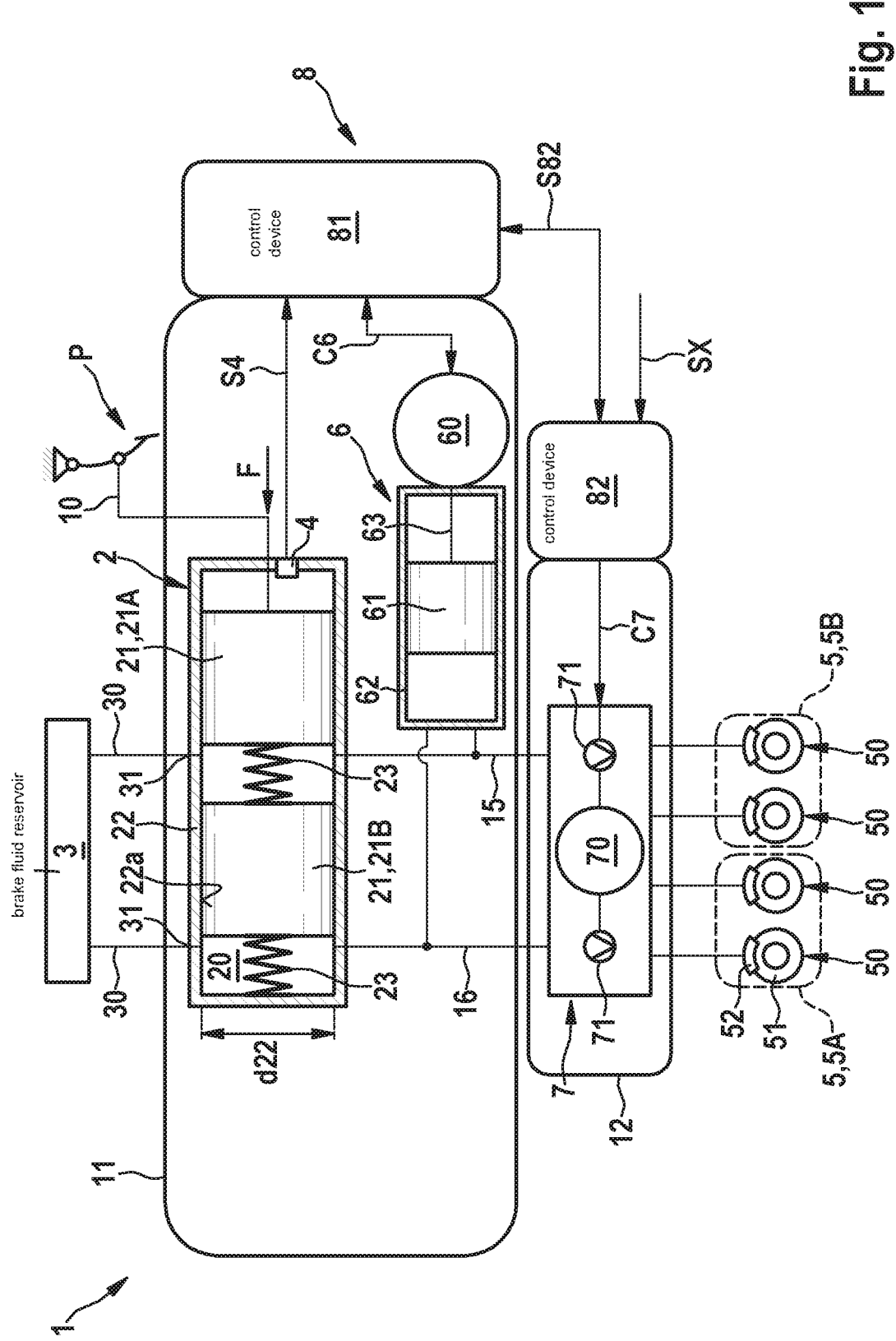
FIG. 1 is a schematic, simplified view of a hydraulic circuit diagram of a braking system according to an exemplifying embodiment of the present invention.

Unless indicated to the contrary, reference characters that are the same in the Figures refer to identical or functionally identical components.

FIG. 1 schematically shows an example braking system 1 for a vehicle, e.g., for a passenger car, a commercial vehicle, or a bus. Braking system 1 has a brake master cylinder 2, a brake fluid reservoir (or simply "reservoir") 3, a sensor device 4, two wheel brake circuits 5A, 5B, a pressure generation device 6, a pressure modulation device 7, and a control system 8.

Brake master cylinder 2 has a brake master cylinder volume 20 as well as at least one displacement piston or actuator piston 21. Brake master cylinder volume 20 can be defined by an inner surface 22a of a cylinder housing 22. Inner surface 22a can define, for example, a cylindrical volume having, in particular, a circular cross section. As depicted schematically in FIG. 1, a diameter d22 of the cross section defined by inner surface 22a can be in a range between 17 and 21 mm, in particular can be in the region of 19.05 mm or can be equal to 19.05 mm. As furthermore schematically depicted in FIG. 1, cylindrical housing 22 can be constituted by a partition of a first housing 11 in which, in addition to brake master cylinder 2, pressure generation device 6 can also be housed, as depicted by way of example in FIG. 1.

As depicted by way of example in FIG. 1, a first and a second displacement piston 21A, 21B can be disposed in brake master cylinder volume 20. In the interest of clarity, reference will be made hereinafter principally to one displacement piston 21. The statements of course apply, however, both to the first and to the second displacement piston 21A, 21B. Displacement piston 21 is movable in brake master cylinder volume 20 by application of an input force F, with the result that hydraulic fluid present in brake master cylinder volume 20 becomes displaced. Input force F can be applied, for example, via a brake pedal P that is kinematically coupled via a linkage 10 to displacement piston 21. Displacement piston 21 is depicted in FIG. 1 in an idle position into which it is preloaded by way of a return device 23, e.g., a spring, when no input force F is being applied or when an input force F that is being applied is less than the return force of the return device.

Reservoir 3 is connected via a hydraulic line 30 to brake master cylinder volume 20. With displacement piston 21 in the idle position, a connecting opening 31 at which hydraulic line 30 opens into brake master cylinder volume 20 is uncovered by displacement piston 21 so that brake fluid exits a fluid-conveying connection between reservoir 3 and brake master cylinder volume 20 for the exchange of brake fluid. When displacement piston 21 is moved, by application of an input force F, out of the idle position into a working position in order to displace brake fluid out of brake master cylinder volume 20, connecting opening 31 becomes closed off by displacement piston 21, and reservoir 3 is thereby decoupled from brake master cylinder volume 20.

Sensor device 4 serves to furnish an electrical or electromagnetic braking request signal S4 that represents input force F and thus a brake pressure requested by the driver who is actuating the brake pedal. Sensor device 4 can be, for example, a pressure sensor that detects a pressure in a simulator circuit (not depicted) that is coupled to brake master cylinder volume 20. Alternatively or in addition thereto, it is possible to use a travel sensor that detects a travel distance over which displacement piston 21 is moved.

Braking system 1 depicted by way of example in FIG. 1 has two wheel brake circuits 5A, 5B each having two wheel brakes 50. In general, at least one wheel brake circuit 5 having at least one wheel brake 50 can be provided. Each wheel brake 50 has a friction surface 51, for instance in the form of a brake disc, and a wheel brake cylinder 52 that, by way of a hydraulic brake pressure in wheel brake circuit 5, is movable against friction surface 51, or pressable against it with a force corresponding to the brake pressure, in order to apply a frictional force. As depicted schematically in FIG. 1, wheel brake circuit 5 is coupled to pressure modulation device 7 that will be further described in detail below. When it is inactive, pressure modulation device 7 constitutes merely a hydraulic line.

Pressure generation device 6 serves to generate the brake pressure in wheel brake circuit 5 and is coupled thereto for that purpose, for instance via hydraulic lines 15, 16 that connect pressure generation device 6 via pressure modulation device 7 to wheel brake circuit 5. Pressure generation device 6 that is depicted schematically and by way of example in FIG. 1 has an electric motor 60 and a pressure generation displacement piston 61 that is shiftable by way of an electric motor 60 in a pressure generation volume 62. Electric motor 60 can be kinematically coupled to pressure generation displacement piston 61, for instance, via a spindle drive or another linkage 63 that is configured to convert a rotary motion into a linear motion. As depicted by way of example in FIG. 1, pressure generation device 6 can be received, together with brake master cylinder 2, in a first housing 11.

Pressure modulation device 7 is depicted merely schematically in FIG. 1, and serves to modulate the brake pressure in wheel brake circuit 5. For example, pressure modulation device 7 can have a pump 71, driven by an electric motor 70, in order to vary the brake pressure. FIG. 1 depicts, by way of example, two pumps 71 that are driven by a common motor 70. Pressure modulation device 7 can furthermore have inlet and outlet valves (not depicted) for delivering or discharging brake fluid into or from wheel brake cylinder 52. Pressure modulation device 7 is connected via lines 15, 16 to brake master cylinder 2 and is hydraulically couplable, e.g., by way of switchable isolation valves (not depicted), to brake master cylinder volume 20. As is further evident from FIG. 1, provision can be made that pressure modulation device 7 is accommodated in a separate second housing 12. Second housing 12 can in particular be mounted on first housing 11.

In braking system 1 depicted by way of example in FIG. 1, control system 8 encompasses a first control device 81 and a second control device 82. Control devices 81, 82 can each have a processor (not depicted), for instance in the form of a CPU, an FPGA, an ASIC, or the like, and a data memory (not depicted), in particular a nonvolatile data memory, for instance in the form of a hard drive, a CD, a DVD, a Blu-Ray® disk, or a flash memory. Control devices 81, 82 are each configured, for instance by way of the processor, to process input signals and, based on the input signals, to generate control commands in order to actuate various components of braking system 1.

As depicted by way of example in FIG. 1, control system 8 is connected to sensor device 4, to pressure generation device 6, and to pressure modulation device 7 for data exchange, for instance via a wire-based connection, e.g., via Ethernet or a CAN bus system, or a wireless connection. e.g., WiFi, Bluetooth®, or the like. Provision can be made in particular that sensor device 4 and pressure generation device 6, in particular electric motor 60, are connected to first control device 81; and that pressure modulation device 7, in particular electric motor 70 of pressure modulation device 7, is connected to second control device 82. In addition, first and second control devices 81, 82 are preferably connected to one another via a wireless or wire-based data connection.

In order to brake a vehicle using braking system 1, an input force F is applied by way of brake pedal P onto displacement piston 21 of brake master cylinder 2, so that displacement piston 21 becomes shifted out of the idle position. Sensor device 4 detects this displacement or input force, and generates in accordance therewith a braking request signal S4 that is received by first control device 81. The latter generates, based on braking request signal S4, a control command C6 that actuates an electric motor 60 of pressure generation device 6. When electric motor 60 is actuated, it shifts pressure generation displacement piston 61 in order to displace brake fluid out of pressure generation volume 62, or take fluid thereinto, in order to vary the brake pressure in wheel brake circuit 5 in accordance with braking request signal S4. Optionally, pressure modulation device 7 modulates the brake pressure based on a control command C7 generated by second control device 82, which generates it based on an input signal SX, e.g., a slippage of the wheels.

The method depicted in FIG. 2 as a flow chart is explained by way of example below with reference to braking system 1 described above.

In a first step M1, a position of displacement piston 21 is ascertained, for instance by control apparatus 81 on the basis of braking request signal S4. In a further step M2, an operational state of pressure generation device 6 is ascertained. For example, "operationally ready" and "not operationally ready" can be ascertained as operational states. In the "not operationally ready" state, no brake pressure can be built up by way of pressure generation device 6, for instance because electric motor 60 is overheated, a voltage supply to electric motor 60 is interrupted, or another operating fault exists. In order to ascertain the operational state, first control apparatus 81 can, for example, evaluate sensor signals of sensors (not depicted) provided on pressure generation device 6, or other status signals generated by pressure generation device 6.

Step M2.1 checks whether "not operationally ready" has been ascertained as an operational state of pressure generation device 6. If that check is negative, as depicted by the symbol "−" in FIG. 2, what follows is a step M5 in which pressure generation device 6 is operated, as described above, in accordance with braking request signal S4 in order to generate the brake pressure. If the result of check M2.1 is positive, as depicted by the "+" symbol in FIG. 2, what follows is step M2.2 which checks, for instance by the fact that first control device 81 evaluates braking request signal S4, whether the displacement piston is in the idle position. If the result of this check is positive, as depicted by the "+" symbol in FIG. 2, step M3 then follows.

In step M3, a pre-filling of wheel brake circuit with brake fluid occurs. This pre-filling M3 encompasses a coupling (block M3.1) of pressure modulation device 7 to brake master cylinder volume 20. This can be accomplished, for example, by the fact that first or second control apparatus 81, 82 generates a control command to open isolation valves in order to connect lines 15, 16, to which pressure modulation device 7 is connected, in hydraulically conveying fashion to brake master cylinder volume 20. Optionally, preferably before the coupling of pressure modulation device 7 to brake master cylinder volume 20, a decoupling of pressure generation device 6 from wheel brake circuit 5 can additionally occur, for instance by the fact that first or second control apparatus 81, 82 generates a control command to close isolation valves that connect pressure generation device 6 to lines 15, 16.

Brake fluid is furthermore conveyed (block M3.2) out of brake master cylinder volume 20 into wheel brake circuit 5 by way of pressure modulation device 7, in order to abut wheel brake cylinder 52 of wheel brake circuit 5 against a friction surface 51 of a wheel brake 50. Because displacement piston 21 is in the idle position, it uncovers connecting opening 31 so that brake fluid can be supplied out of reservoir 3 back into brake master cylinder volume 20 when pressure modulation device 7 removes brake fluid from brake master cylinder volume 20. As a result of the delivery of this brake fluid into wheel brake circuit 5, wheel brake cylinder 52 of the respective wheel brake 50 becomes abutted against friction surface 51. "Abutted" or "abut" is to be understood here to mean that a predetermined frictional force is generated between wheel brake cylinder 52 and friction surface 51, that force being negligibly small, for instance less than 3%, compared with a frictional force that is necessary in order to achieve a predetermined negative acceleration of the vehicle, for example in a range between 1 m/s² and 2 m/s². In order to convey the brake fluid out of brake master cylinder volume 20 into wheel brake circuit 5, first control device 81 can, for instance, generate a requirement signal S82 and transmit it to second control device 82, requirement signal S82 representing the operational state of pressure generation device 6. Based on requirement signal S82 and optionally based on further input signals SX, for instance a current brake pressure in wheel brake circuit 5, second control device 82 generates a control command C7 that produces an actuation of pressure modulation device 7. In particular, on the basis of control command C7, pressure modulation device 7 is caused to convey a specific quantity of brake fluid out of brake master cylinder volume 20 into wheel brake circuit 5. Depending on the driving situation, for example based on a signal of first or second control device 81, 82, this step M3 can be repeated cyclically in order to compensate for dynamic effects (e.g. skewing of brake disks) that annul the abutment of the brake linings.

In order to generate the brake pressure in the wheel brake circuit, in step M4, a shifting of displacement piston 21 of brake master cylinder 2 occurs as a result of the application of input force F, e.g., via pedal P. As a result of the pre-filling, a large volume of brake fluid is already present in wheel brake circuit 5. The result is that a volume that must be displaced by displacement piston 21 in order to establish a given brake pressure in wheel brake circuit 5 is relatively small. Brake master cylinder volume 20 can thus be configured to be relatively small, in particular to have a small diameter d22. A very compact braking system is thereby achieved. In addition, because of the decreased cross-sectional area, the force F that is necessary in order to establish the intended brake pressure is advantageously decreased.

Figure 2:
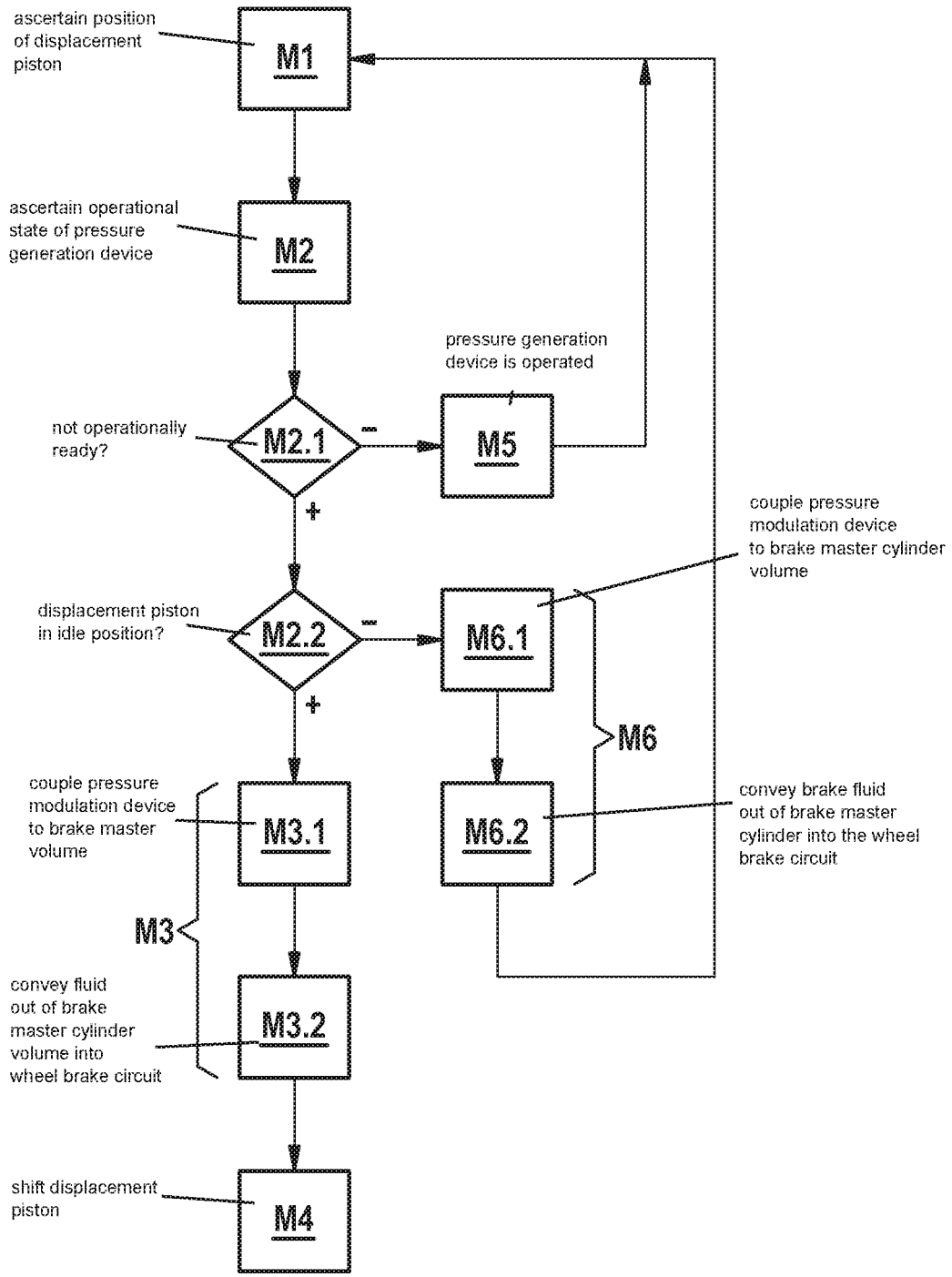
FIG. 2 is a flow chart of a method according to an exemplifying embodiment of the present invention.

As is further depicted in FIG. 2, before the pre-filling in step M3 a brake pressure compensation M6 can optionally be carried out if the decision in step M2.2 is negative, as depicted by the "−" symbol in FIG. 2. The brake pressure compensation M6 thus occurs if the operational status of pressure generation device 6 is ascertained to be nonoperational (block M2.1), and if it is ascertained that the displacement piston has moved out of the idle position (block M2.2). Brake pressure compensation encompasses coupling (M6.1) pressure modulation device 7 to brake master cylinder volume 20, as described above in conjunction with step M3.1. In addition, brake fluid is conveyed (M6.2) out of brake master cylinder volume 20 into wheel brake circuit 5 in order to generate, in wheel brake circuit 5, the brake pressure in accordance with braking request signal S4. In this context, first control apparatus 81 generates, based on braking request signal S4, a requirement signal S82 that represents braking request signal S4, and forwards the latter to second control apparatus 82. Based on requirement signal S82, second control apparatus 82 generates a control command C7 that causes pressure modulation device 7 to generate the desired brake pressure as a supplement to the displacement of displacement piston 21 of brake master cylinder 2 by input force F. In particular, electric motor 70 of pressure modulation device 7 is controlled in accordance with control command C7 to bring about a pressure buildup by way of pumps 71.

Although the present invention has been explained above by way of example with reference to exemplifying embodiments, it is not limited thereto but is instead modifiable in many ways. In particular, combinations of the exemplifying embodiments above are also possible.

What is claimed is:

1. A braking system for a vehicle, comprising:
   a brake master cylinder having a displacement piston which is shiftable out of an idle position in a brake master cylinder volume by an input force;
   a brake fluid reservoir that is coupled to the brake master cylinder volume and is fluid-exchange-capable with the brake master cylinder volume when the displacement piston is in the idle position;
   a sensor device configured to generate a braking request signal representing the input force;
   a wheel brake circuit having at least one wheel brake that has a friction surface and a wheel brake cylinder movable against the friction surface;
   an electrically driven pressure generation device, coupled to the wheel brake circuit, configured to generate a brake pressure in the wheel brake circuit in accordance with the braking request signal;
   a pressure modulation device, coupled to the wheel brake circuit, configured to modulate the brake pressure that is couplable to the brake master cylinder volume; and
   a control system that is connected to the sensor device, to the pressure generation device, and to the pressure modulation device, and is configured to:
      actuate the pressure generation device in accordance with the braking request signal to generate the brake pressure;
      ascertain an operational state of the pressure generation device;
      ascertain a position of the displacement piston based on the braking request signal; and
      couple the pressure modulation device to the brake master cylinder volume and actuate the pressure modulation device in such a way that the pressure modulation device conveys brake fluid out of the brake master cylinder volume into the wheel brake circuit to abut the wheel brake cylinder against the friction surface, if the operational state of the pressure generation device is ascertained to be nonoperational and the displacement piston is in the idle position.

2. The braking system as recited in claim 1, wherein the control system includes a first control device that is connected to the sensor device and to the pressure generation device, and includes a second control device that is connected to the first control device and to the pressure modulation device.

3. The braking system as recited in claim 1, wherein the pressure modulation device includes a pump driven by an electric motor, the electric motor being connected to the control system.

4. The braking system as recited in claim 1, wherein the pressure generation device includes a pressure generation displacement piston shiftable using an electric motor, the electric motor being connected to the control system.

5. The braking system as recited in claim 1, wherein the brake master cylinder volume is defined by a cylindrical inner surface of a housing, the inner surface having a diameter in a range between 17 mm and 21 mm.

6. The braking system as recited in claim 5, wherein the diameter is 19.05 mm.

7. A method for braking a vehicle, comprising the following steps:
   ascertaining a position of a displacement piston of a brake master cylinder which is shiftable out of an idle position inside a brake master cylinder volume of the brake master cylinder by an input force to generate a braking request signal, a brake fluid reservoir being fluid-exchange-capable with the brake master cylinder volume when the displacement piston is in the idle position;
   ascertaining an operational state of a pressure generation apparatus that is coupled to a wheel brake circuit and is operated so as to generate a brake pressure in accordance with the braking request signal;
   carrying out a pre-filling of the wheel brake circuit when the operational status of the pressure generation device is ascertained to be nonoperational and the displacement piston is ascertained to be in the idle position, the pre-filling including:
      coupling a pressure modulation device, coupled to the wheel brake circuit, to the brake master cylinder volume; and
      conveying brake fluid out of the brake master cylinder volume into the wheel brake circuit using the pressure modulation device to abut a wheel brake cylinder of the wheel brake circuit against a friction surface of a wheel brake; and
   generating a brake pressure in the wheel brake circuit by shifting the displacement piston of the brake master cylinder by application of an input force.

8. The method as recited in claim 7, wherein a brake pressure compensation is carried out, before pre-filling, when the operational status of the pressure generation device is ascertained to be nonoperational and when it is ascertained that the displacement piston has traveled out of the idle position, the brake pressure compensation including:
   coupling the pressure modulation device to the brake master cylinder volume; and
   conveying brake fluid out of the brake master cylinder volume into the wheel brake circuit to generate the brake pressure in the wheel brake circuit in accordance with the braking request signal.

9. The method as recited in claim 7, wherein the pressure generation device is decoupled from the wheel brake circuit before the pre-filling.

* * * * *

UNITED STATES PATENT AND TRADEMARK OFFICE
CERTIFICATE OF CORRECTION

| | | |
|---|---|---|
| PATENT NO. | : 11,273,815 B2 | |
| APPLICATION NO. | : 16/856478 | |
| DATED | : March 15, 2022 | |
| INVENTOR(S) | : Herbert Vollert, Jonathan Schnur and Markus Weigel | |

It is certified that error appears in the above-identified patent and that said Letters Patent is hereby corrected as shown below:

On the Title Page

In Item (30) Foreign Application Data, replace:
"102019206668"

With:
--102019206668.2--

Signed and Sealed this
Fifth Day of July, 2022

Katherine Kelly Vidal
*Director of the United States Patent and Trademark Office*